United States Patent
Jastrzebski et al.

(10) Patent No.: US 11,120,083 B1
(45) Date of Patent: *Sep. 14, 2021

(54) QUERY RECOMMENDATIONS FOR A DISPLAYED RESOURCE

(71) Applicant: Google LLC, Mountain View, CA (US)

(72) Inventors: Michal Jastrzebski, Zurich (CH); Aurelien Boffy, Basel (CH); Gokhan H. Bakir, Zurich (CH); Behshad Behzadi, Freienbach (CH); Marcin M. Nowak-Przygodzki, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/683,856

(22) Filed: Nov. 14, 2019

Related U.S. Application Data

(63) Continuation of application No. 15/388,757, filed on Dec. 22, 2016, now Pat. No. 10,489,459.

(60) Provisional application No. 62/365,003, filed on Jul. 21, 2016.

(51) Int. Cl.
*G06F 16/9032* (2019.01)
*G06F 16/25* (2019.01)

(52) U.S. Cl.
CPC ...... *G06F 16/90324* (2019.01); *G06F 16/252* (2019.01)

(58) Field of Classification Search
CPC ............ G06F 16/90324; G06F 16/252; G06F 16/24578; G06F 16/35; G06F 16/319; G06F 16/3322; G06F 16/951

USPC ................. 707/722, 723, 728, 769, 999.007
See application file for complete search history.

(56) References Cited

U.S. PATENT DOCUMENTS

| | | | |
|---|---|---|---|
| 7,389,181 B2 | 6/2008 | Meadow | |
| 7,689,613 B2 | 3/2010 | Candelore | |
| 7,788,266 B2 | 8/2010 | Venkataraman | |
| 8,316,019 B1 | 11/2012 | Ainslie et al. | |
| 8,321,406 B2 | 11/2012 | Garg et al. | |
| 8,391,618 B1 | 3/2013 | Chuang | |
| 8,392,435 B1 | 3/2013 | Yamauchi | |
| 8,463,810 B1 * | 6/2013 | Rennison | G06F 16/3334 707/771 |

(Continued)

OTHER PUBLICATIONS

U.S. Appl. No. 13/069,978, filed Mar. 23, 2011, Taubman et al.

(Continued)

*Primary Examiner* — Dung K Chau
(74) *Attorney, Agent, or Firm* — Middleton Reutlinger

(57) ABSTRACT

Methods, systems, and apparatus, including computer programs encoded on a computer storage medium, for providing contextual information to a user. In one aspect, a method includes receiving, from a user device, a query-independent request for contextual information relevant to an active resource displayed in an application environment on the user device, generating multiple queries from displayed content from the resource, determining a quality score for each of the multiple queries, selecting one or more of the multiple queries based on their respective quality scores, and providing, to the user device for each of the selected one or more queries, a respective user interface element for display with the active resource, wherein each user interface element includes contextual information regarding the respective query and includes the respective query.

20 Claims, 4 Drawing Sheets

(56) References Cited

U.S. PATENT DOCUMENTS

| | | | |
|---|---|---|---|
| 8,515,185 B2 | 8/2013 | Lee | |
| 8,521,764 B2 | 8/2013 | Pfleger | |
| 8,606,781 B2 | 12/2013 | Chi et al. | |
| 8,898,095 B2 | 11/2014 | Agrawal | |
| 9,690,872 B2* | 6/2017 | Whitnah | G06F 16/2423 |
| 2001/0053968 A1 | 12/2001 | Galitsky | |
| 2005/0060311 A1* | 3/2005 | Tong | G06F 16/951 |
| 2007/0060114 A1 | 3/2007 | Ramer et al. | |
| 2007/0071320 A1 | 3/2007 | Yada | |
| 2007/0140595 A1 | 6/2007 | Taylor | |
| 2007/0214131 A1 | 9/2007 | Cucerzan | |
| 2008/0046405 A1 | 2/2008 | Olds et al. | |
| 2008/0270110 A1 | 10/2008 | Yurick | |
| 2010/0306249 A1 | 12/2010 | Hill | |
| 2011/0035406 A1 | 2/2011 | Petrou et al. | |
| 2011/0038512 A1 | 2/2011 | Petrou et al. | |
| 2011/0125735 A1 | 5/2011 | Petrou | |
| 2011/0128288 A1 | 6/2011 | Petrou et al. | |
| 2011/0131241 A1 | 6/2011 | Petrou et al. | |
| 2011/0137895 A1 | 6/2011 | Petrou et al. | |
| 2012/0109858 A1 | 5/2012 | Makadia et al. | |
| 2012/0191745 A1 | 7/2012 | Velipasaoglu et al. | |
| 2012/0215533 A1 | 8/2012 | Aravamudan et al. | |
| 2013/0007201 A1* | 1/2013 | Jeffrey | H04N 21/41422 709/217 |
| 2013/0132361 A1 | 5/2013 | Chen et al. | |
| 2013/0282709 A1* | 10/2013 | Zhu | G06F 16/3322 707/728 |
| 2013/0290319 A1* | 10/2013 | Glover | G06F 16/24578 707/723 |
| 2013/0346400 A1 | 12/2013 | Ramsey et al. | |
| 2014/0046935 A1 | 2/2014 | Bengio et al. | |
| 2014/0172881 A1 | 6/2014 | Petrou et al. | |
| 2014/0344265 A1* | 11/2014 | Boucher | G06F 16/2423 707/732 |
| 2015/0058318 A1 | 2/2015 | Blackwell | |
| 2015/0161202 A1* | 6/2015 | Shapira | G06F 16/235 707/723 |
| 2016/0042067 A1* | 2/2016 | Weng | G06Q 30/0251 707/723 |
| 2017/0161373 A1* | 6/2017 | Goyal | G06F 16/9035 |
| 2017/0186035 A1* | 6/2017 | Levin | G06F 16/248 |
| 2017/0195394 A1* | 7/2017 | Kothari | H04L 65/1069 |
| 2017/0230329 A1* | 8/2017 | Akef | H04L 65/1069 |

OTHER PUBLICATIONS

U.S. Appl. No. 13/906,889, filed May 31, 2013, Heiler et al.
U.S. Appl. No. 14/313,519, filed Jun. 24, 2014, Bakir et al.
"10 Mobile Astronomy Apps for Stargazers," [online][Retrieved on Apr. 29, 2014]; Retrieved from the Internet URL: http://mashable.com/2011/06/21/astronomy-mobile-apps/, 2011, 13 pages.
"Google announces Search by Image and Voice Search for desktop, revamped mobile search," [online] Jun. 14, 2011 [Retrieved on Mar. 22, 2017] Retrieved from the Internet URL: https://www.engadget.com/2011/06/14/google-announces-search-by-image-search-by-voice-for-desktop/> 1 page.
"Google's Impressive "Conversational Search" Goes Live on Chrome," [online] [Retrieved on May 5, 2014]; Retrieved from the Internet URL: http://searchengineland.com/google-impressive-conversational-search-goes-line-on-chrome-160445, 2013, 12 pages.
Zhang et al., "Probabilistic Query Rewriting for Efficient and Effective Keyword Search on Graph Data," Proceedings of the VLDB Endowment 6(14):1642-1653, 2013, 12 pages.

* cited by examiner

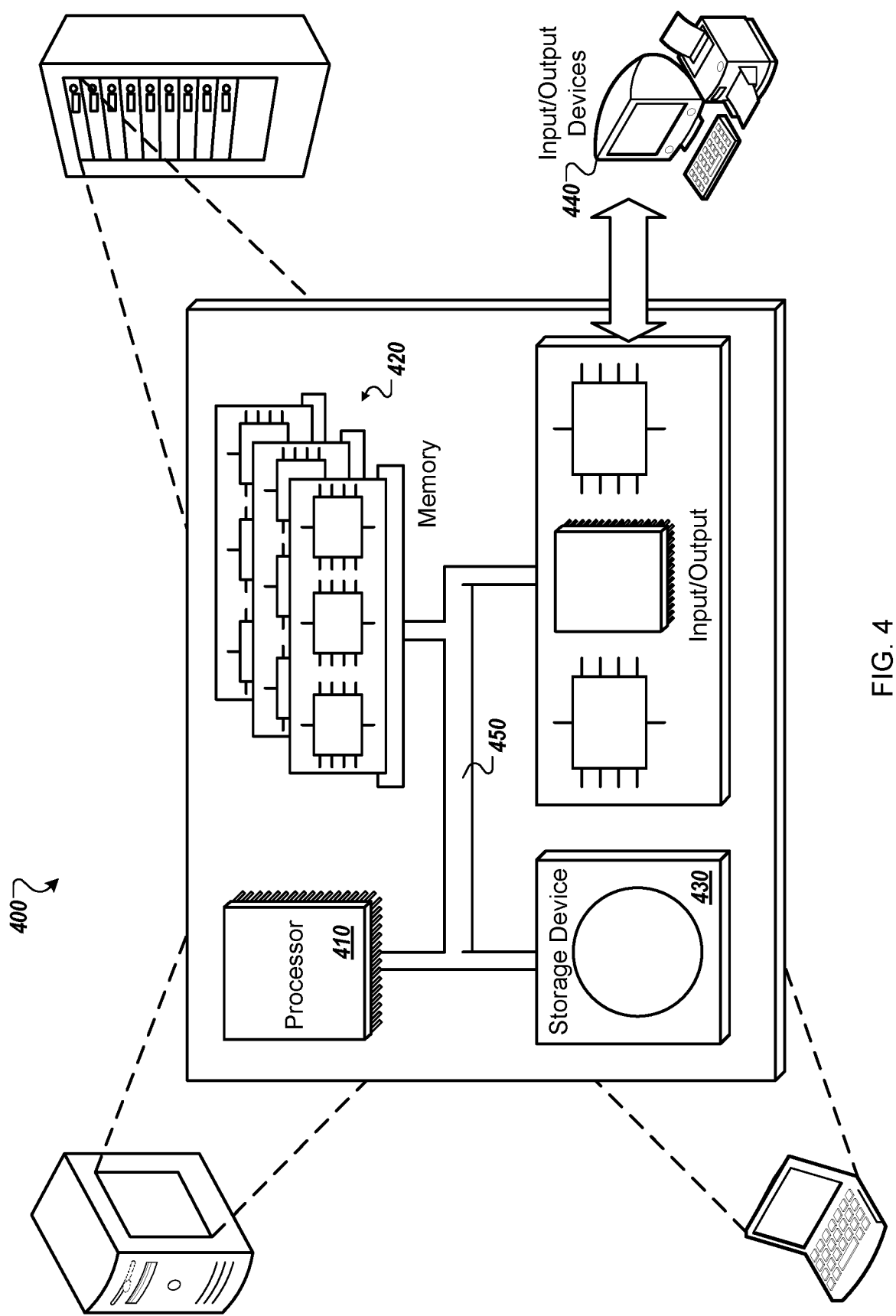

ns the multiple queries. In some aspects, determining a quality score for each of the multiple queries includes determining the quality score for each of the multiple queries based at least on the visual appearance of terms from which the respective query is generated. In some implementations, determining a quality score for each of the multiple queries includes determining that the terms from which a particular query is generated appear in a title of the active resource and determining the quality score for the particular query based at least on determining that the terms from which the particular query is generated appear in the title of the active resource.

QUERY RECOMMENDATIONS FOR A DISPLAYED RESOURCE

CLAIM OF PRIORITY

This application is a continuation application which claims the benefit of priority under 35 USC § 120 of U.S. application Ser. No. 15/388,757, filed Dec. 22, 2016, which claims priority under 35 USC § 119(e) to U.S. Patent Application Ser. No. 62/365,003, filed on Jul. 21, 2016, the entire contents of which are hereby incorporated by reference.

BACKGROUND

This specification relates to providing contextual information to a user.

A device may provide a user with contextual information. For example, a device may display a web page about a particular subject, receive a search query from the user including search terms for the particular subject, retrieve search results responsive to the search query, and provide the search results to the user.

Typical interaction models require users to provide some form of a user query to a user device. For example, a user may be viewing article about a particular piece of sporting equipment on a smart phone and state "show me reviews about this item." A search process then analyzes the article, and the query which is dependent on the article, to determine search parameters and execute a search of resources to identify resources that may satisfy the user's informational needs.

SUMMARY

In general, one innovative aspect of the subject matter described in this specification can be embodied in methods that include the actions of receiving, from a user device, a query-independent request for contextual information relevant to an active resource displayed in an application environment on the user device, generating multiple queries from displayed content from the resource, determining a quality score for each of the multiple queries, selecting one or more of the multiple queries based on their respective quality scores, and providing, to the user device for each of the selected one or more queries, a respective user interface element for display with the active resource, where each user interface element includes contextual information regarding the respective query and includes the respective query.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In certain aspects, generating multiple queries from displayed content from the resource includes generating different combinations of terms in the displayed content as the multiple queries. In some aspects, determining a quality score for each of the multiple queries includes determining the quality score for each of the multiple queries based at least on the visual appearance of terms from which the respective query is generated. In some implementations, determining a quality score for each of the multiple queries includes determining that the terms from which a particular query is generated appear in a title of the active resource and determining the quality score for the particular query based at least on determining that the terms from which the particular query is generated appear in the title of the active resource.

In certain aspects, determining a quality score for each of the multiple queries includes determining a quality of search results responsive to each query and determining the quality score for each of the multiple queries based at least on the quality of search results responsive to the respective query. In some aspects determining a quality score for each of the multiple queries includes determining a measure of user engagement for each query and determining the quality score for each of the multiple queries based at least on the measure of user engagement for each respective query. In some implementations, receiving, from a user device, a query-independent request for contextual information relevant to an active resource displayed in an application environment on the user device includes receiving, from the user device, a query-independent request that does not include one or more query terms entered by a user. In certain aspects, the resource includes one or more of a web page, an application page, or a textual conversation.

Particular embodiments of the subject matter described in this specification can be implemented so as to realize one or more of the following advantages. Contextual information that is likely to help satisfy a user's informational need may be provided by a device to a user without the user providing a query to the device. The contextual information provided by the device may be in the form of interface elements that can be selected to request resources responsive to search queries recommended by a system. The resources responsive to the search queries may satisfy the user's information need. Accordingly, this results in a convenient way for the user to obtain resources that may satisfy the user's informational need. Contextual information may also include data describing certain facts, images and search results.

In particular, the system enables the input of a query-independent request for contextual information that is relevant to an active resource displayed on the user device in a fluid and intuitive manner. The user no longer needs to type in query terms or speak query terms to obtain resources that satisfy the user's informational needs. Accordingly, users are more likely to solicit information to satisfy their information needs as doing so can be accomplished in a manner that is not only convenient for the user, but also in a relatively discrete manner so that bystanders are not disturbed by the user speaking into the device. Also, because the user need not type in a query, the user may, in some implementations, solicit the information when the user would otherwise be unable to type effectively, e.g., when the user only has one hand free.

Also, because the input of the query-independent request for contextual information results in a selection by the user of a recommended query, the system does not need to perform text-to-speech processing or process typing input. This results in fewer input errors and erroneously input queries. Accordingly, when considered in the aggregate, thousands of erroneous and inaccurate queries are avoided, which in turn provides a more efficient use of search system resources. In other words, multiple erroneous query processing cycles are avoided, which reduces processing resources required and reduces overall system bandwidth requirements (or, alternatively, enables a larger number of users to be serviced without a commensurate increase in processing resources). This improvement in the technological field of search processing is thus another distinct advantage realized by the systems and methods described below.

Additionally, the system may recommend queries that are more likely to provide results that satisfy informational needs of the user. For example, the system may avoid recommending search queries that have few or no results and avoid recommending search queries that are frequently followed by refined search queries. Accordingly, the system may reduce the need for users to try multiple different queries in an attempt to satisfy their information need. Thus, the system may reduce the time, processing, and bandwidth needed for a user to obtain information that satisfies their informational needs.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 is a schematic diagram of a computer system.

Like reference numbers and designations in the various drawings indicate like elements.

DETAILED DESCRIPTION

Sometimes a user may desire to receive additional information regarding the subject matter of a resource that the user is currently viewing on a device. For example, a user may be viewing a web page mentioning that the "Plexus 6X," a particular make and model of a mobile user device, is now available for preorder and may desire to obtain additional information about how to preorder the "Plexus 6X." The user may open a web page for a search engine, type in "Plexus 6X Preorder" as a search query, scroll through a search results listing, and then select a search result to view. However, this process may be time consuming and require multiple interactions by the user.

Described below are systems and methods for providing contextual information for a displayed resource. Instead of providing contextual information based on a query entered by a user, the system may provide contextual information for a displayed resource and independent of a query input in which a user specifies a particular query. To provide the contextual information, the system detects that a user desires contextual information. For example, a user viewing a webpage about preordering the "Plexus 6X" on their phone may press a button for three seconds, or provide some other indication like pressing a dedicated button or performing a particular gesture, to indicate that the user wishes to receive contextual information based on the displayed webpage. The system may detect the indication and, in response, recommend popular search queries that include terms that are currently being displayed on the phone and typically satisfy informational needs of users. For example, the system may identify that the terms "Plexus 6X" and "preorder" are both being displayed, determine that "Plexus 6X preorder" is a popular search query and determine that users typically do not provide refined search queries, e.g., queries where terms are added or removed from a previous query to better identify results that satisfy a user's continued informational need, after viewing results for the query "Plexus 6X preorder." Based on these determinations, the system provides an interface element that includes the query "Plexus 6X preorder" to the device and an element that can be selected to request results for the query.

These features and additional features are described in more detail below.

Figure 1:
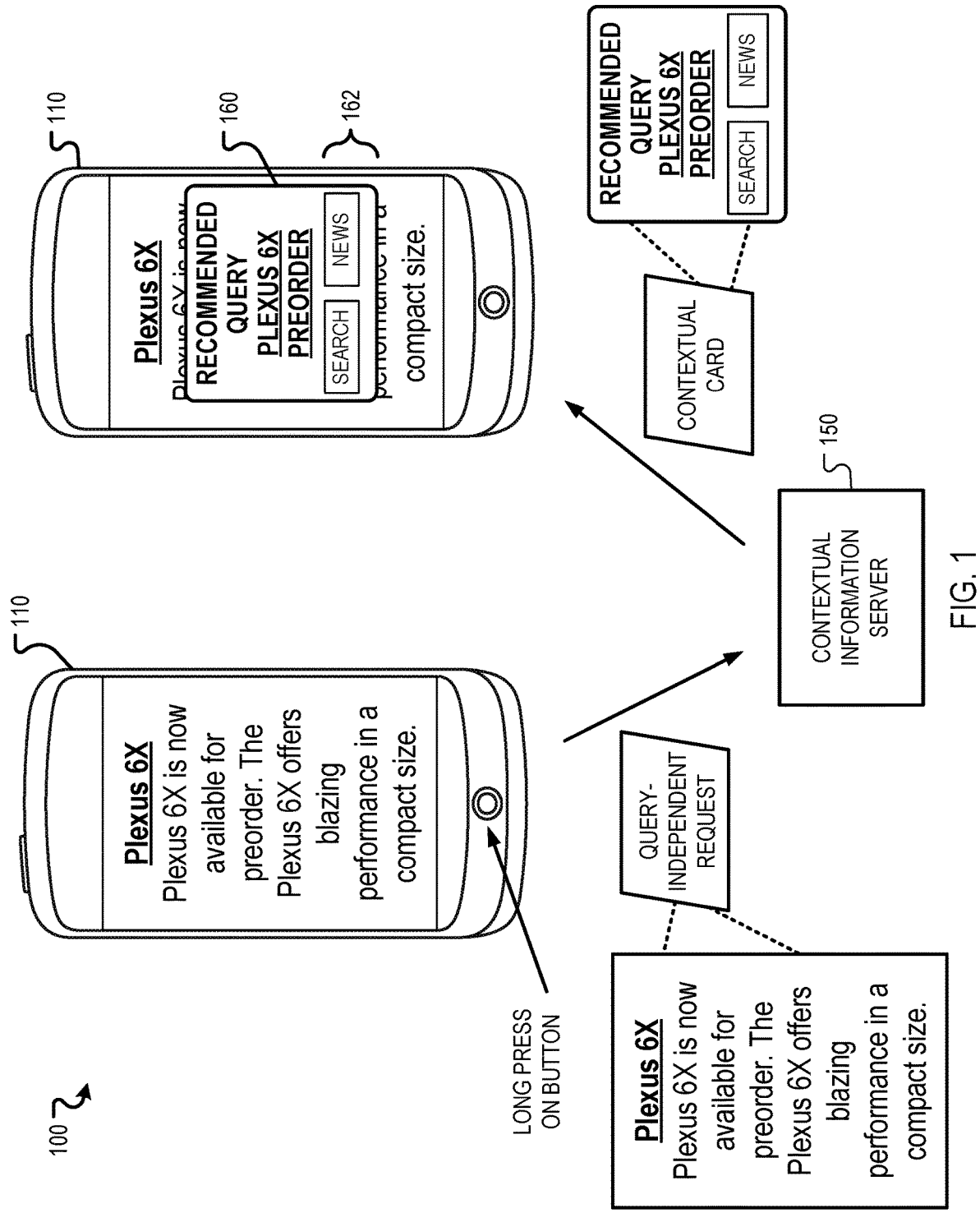
FIG. 1 is a block diagram of an example environment in which contextual information is provided for a displayed resource.

FIG. 1 is a block diagram of an example environment 100 in which contextual information is provided for a displayed resource. The environment 100 includes a user device 110 and a contextual information server 150.

A user device 110 is used by a user to obtain contextual information for a displayed resource. The user device 110 is an electronic device that is capable of requesting and receiving resources over the network. Example user devices 110 include personal computers (e.g., desktops or laptops), mobile communication devices (e.g., smart phones or tablets), and other devices that can send and receive data over the network (e.g., televisions, and glasses or watches with network communication functionality). A user device typically includes a user application, e.g., a web browser, to facilitate the sending and receiving of data over the network. The web browser can enable a user to display and interact with text, images, videos, music and other information typically located on a web page at a website on the World Wide Web or a local area network. The user device 110 may use any appropriate application to send and receive data over the network and present requested resources to a user.

A resource is data that includes content that can be visibly rendered by the user device 110. For example, resources may include HTML pages, electronic documents, images files, video files, text message conversations, e-mails, graphical user interfaces of applications, etc. An active resource may be considered a resource that is currently being displayed on the user device 110. Typically, the active resource is rendered by an application that is running in a foreground of a user device.

The user device 110 detects that a user desires contextual information for an active displayed resource. For example, the user device 110 may be displaying a resource hosted by a website, where the resource includes text in the active viewport that describes that the "Plexus 6X" is now available for preorder. The user may generate an indication of desiring contextual information, e.g., by pressing a button for three seconds or tapping the screen according to a predefined tap patter, etc. Assume for illustrative purposes the user performs a long press that indicates that the user desires contextual information for a displayed resource. In response, the user device 110 provides a request to the contextual information server 150 for contextual information for the displayed resource. For example, the user device 110 may provide a request that includes a screenshot of the currently displayed portion of the active resource, where the portion includes the text "Plexus 6X is now available for preorder." In this example, information in the active window of the active resource is used to generate queries for contextual information, which will be described in more detail below. However, other information can also be used to generate queries, such as the text of the active resource, including text not displayed in the active window, the URI of the resource, and the like.

The request may be considered a query-independent request as the user device 110 provides the request to the contextual information server 150 without having the user enter terms for a query, whether verbally, physically, or some other interaction. For example, after the user device 110 detects that a user has long pressed a button, the user device 110 may provide the request to the contextual information server 150 without requesting additional information from the user.

In response to providing the request to the contextual information server 150, the user device 110 then receives a user interface element from the contextual information server 150. The user interface element may include a recommended search query identified based on content in the displayed resource text and contextual information in the form of a navigation link that may be selected to request results for the search query. For example, the user device 110 may receive a user interface element that includes the text "Recommended Query," "Plexus 6X Preorder," and navigation links for searching for resources using the query "Plexus 6X Preorder" and searching for news articles using the query "Plexus 6X Preorder."

For the purposes of illustration, the user interface element is described as a card. However, other user interface elements may be used, for example, chat bubbles, selectable linked notes or footnotes, synthesized voice responses, or other forms. In some implementations, instead of a single user interface element that includes multiple navigation links, a user interface element may include a single navigation link and multiple user interface elements may be received for different resources.

The user device 110 displays the received contextual card to the user. For example, the user device 110 may generate a graphical panel 160 that is shown overlaid on top of the displayed resource where the graphical panel 160 includes navigation links for the query recommended by the card. In another example, the user device 110 may stop displaying the resource and instead display the graphical panel 160. The user device 110 may enable the user to quickly return to the displayed resource. For example, the user device 110 may stop displaying the graphical panel 160 in response to detecting that a user has interacted with, e.g., clicked or touched, a portion of the resource that is not overlaid by the graphical panel 160. In another example, the user device 110 may stop displaying the graphical panel 160 and display the resource in response to detecting that a user has interacted with, e.g., clicked or touched, a selectable option for closing the graphical panel 160.

Figure 2:
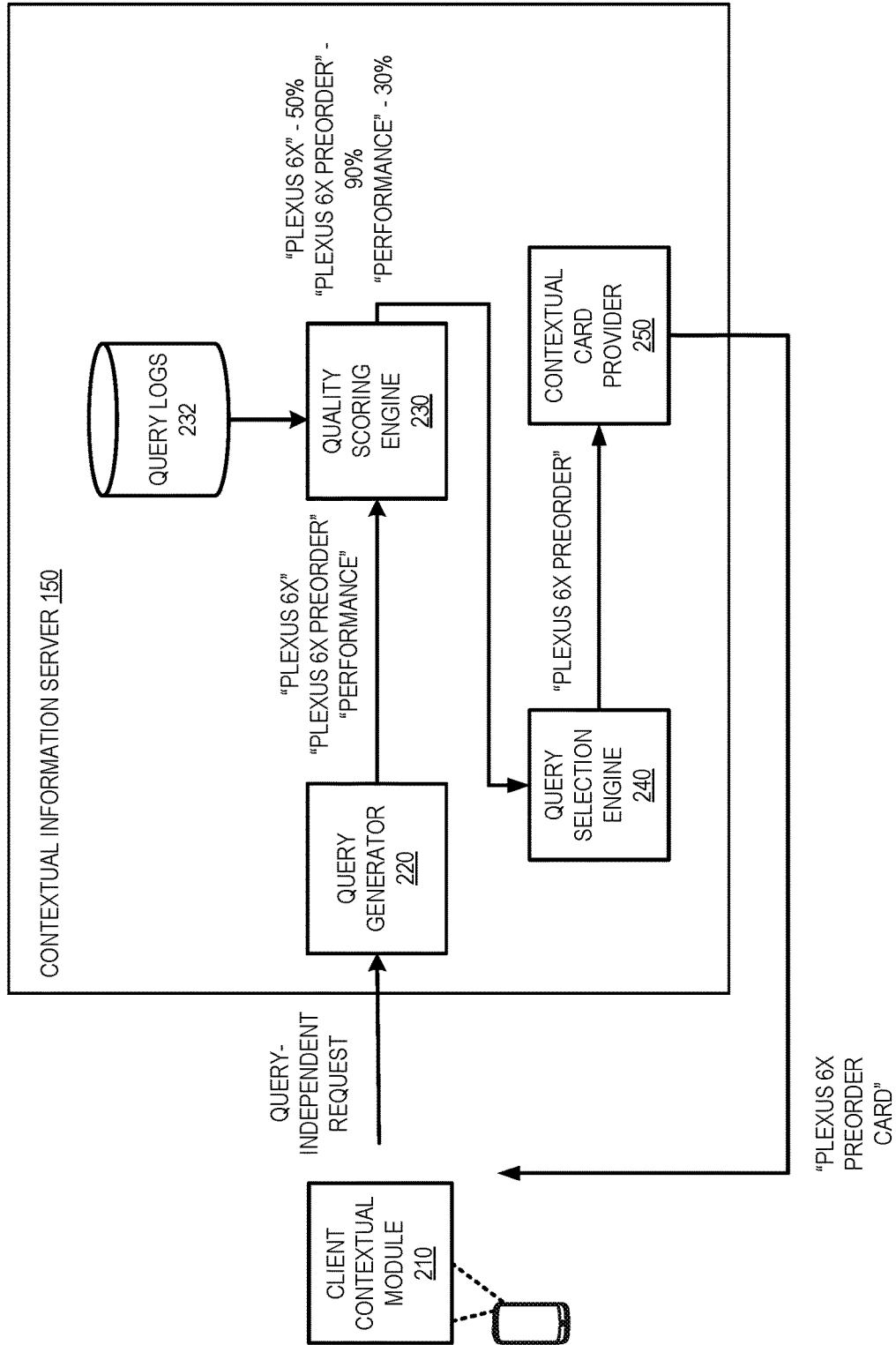
FIG. 2 is a more detailed block diagram of the example environment in which contextual information is provided for a displayed resource.

FIG. 2 is a more detailed block diagram of the example environment 100 in which contextual information is provided for a resource. The environment 100 includes a client contextual module 210 on a user device and a contextual information server 150. The contextual information server 150 includes a query generator 220, a quality scoring engine 230, a query selection engine 240, and a contextual card provider 250. In some implementations, the client contextual module 210 may be provided on the user device 110 shown in FIG. 1.

The client contextual module 210 determines that a user desires contextual information for a displayed resource. For example, the client contextual module 210 may determine that a user has rapidly pressed a button three times when viewing a webpage about the "Plexus 6X" being available for preorder (in this example, rapidly pressing the button three times indicates that the user desires contextual information). In response to determining that a user desires contextual information for a displayed resource, the client contextual module 210 generates a request to the contextual information server 150 for contextual information for the displayed resource. For example, the client contextual module 210 may generate a request to the contextual information server 150 for contextual information for the webpage that describes that the "Plexus 6X" is available for preorder.

The client contextual module 210 may include information about the displayed resource in the request. For example, the client contextual module 210 may generate a screenshot that is an image showing the webpage and include the screenshot in the request. In another example, the client contextual module 210 by request that the operating system of the user device provide a tree based document object model that defines what is currently being rendered in an application that is in a foreground and include the model in the request. The document object model may define text that appears in the displayed resource and the appearance of the text, e.g., size, color, position, font, or other formatting, of the text. In yet another example the client contextual module 210 may include various handlers, such as text handlers and image handlers, to determine text and image data displayed in the active window of the device and provide the text and image data as part of the request.

In some implementations, the client contextual module 210 may include the information about the displayed resource in the request by determining a source of the displayed resource and including an indication of the source of the request. For example, the client contextual module 210 may determine that displayed resource is provided by a web browser application, in response, determine that the web browser application can provide a uniform resource locator (URL) for the displayed resource, and, in response, include an indication in the request that the source of the active resource is the web browser application and the URL for the displayed resource. Information may additionally or alternatively include metadata describing the displayed resource, a location of the user device, a portion not currently displayed of the resource, or an identity of the user. For example, the client contextual module 210 may determine that the user device 110 is located in Atlanta and include a location of "Atlanta" in the request.

The client contextual module 210 then provides the request to the query generator 220 without the user entering a query. For example, the client contextual module 210 provides the request to the query generator 220 in response to the user providing the indication that the user desires contextual information for the displayed resource, e.g., three rapid button presses, a long button press, or some other indication, without the user providing any further information, e.g., query terms, after providing the indication.

In response to providing the request to the query generator 220, the client contextual module 210 receives a contextual card and renders the contextual card. For example, the client contextual module 210 receives a contextual card that includes a query "Plexus 6X Preorder" and navigation links to request search results or news results for the query. As will be described below, the contextual card is generated by the contextual information server 150 in response to the query independent request.

The query generator 220 receives the query independent request for contextual information for a displayed resource and generates queries from the content of the displayed resource. For example, the query generator 220 may receive a screenshot including the text "Plexus 6X is now available for preorder. The Plexus 6X offers blazing performance in a compact size" and generates queries of "Plexus 6X," "Plexus 6X Preorder," and "Performance."

The query generator 220 may generate queries by combining text from the displayed resource in various combinations. For example, the query generator 220 may receive a screenshot including the text "Plexus 6X is now available for preorder. The Plexus 6X offers blazing performance in a compact size," perform optical character recognition to extract the text from the screenshot, and then generate the query "Plexus 6X Preorder" by combining "Plexus 6X" and "Preorder" from the text. In another example, the query generator 220 may receive a document object model that includes the text "Plexus 6X is now available for preorder. The Plexus 6X offers blazing performance in a compact size," and select "Plexus 6X" from the text as the query.

In some implementations, the query generator 220 may use natural language grammar rules to generate the queries. The query generator 220 may generate queries with terms with different tenses or pluralities than terms in the displayed resource. For example, the query generator 220 may generate the query "blaze Plexus size" from "blazing," "Plexus," and "size" in the displayed resource.

In other implementations, the query generator 220 may generate a set of all possible n-grams from the text. In still other implementations, stop words may be removed from the text and the remaining text may be used to generate the queries. Other appropriate query generation techniques may also be used.

The quality scoring engine 230 receives the queries from the query generator 220 and determines quality scores for each of the queries. For example, the quality scoring engine 230 may receive the queries "Plexus 6X," "Plexus 6X Preorder," and "performance" from the query generator 220 and determine a quality score of 50% for "Plexus 6X," a quality score of 90% for "Plexus 6X Preorder," and a quality score of 30% for "performance." A quality score for a query may reflect a confidence that the query will identify resources that satisfy a user's informational need. For example, a quality score of 50% for "Plexus 6X" may reflect a medium confidence that the query will identify resources that satisfy a user's informational need and a quality score of "90%" for "Plexus 6X Preorder" may reflect a high confidence that the query will identify resources that satisfy a user's informational need. Alternatively a quality score for each query may be simply be a value that indicates a quality of the query relative to the quality of other queries, and need not represent a confidence that the query will identify resources that satisfy a user's informational need. Other appropriate metrics of quality for a query may also be used for quality scores.

The quality scoring engine 230 may determine the quality score for a search query based on one or more of a number of search results responsive to the search query, the underlying quality of the references referenced by the search results, a popularity of the search query, user behavior regarding search results of the search query, the prominence of text of the query in the content in the displayed resource, and the like.

For determining the quality score based on a number of search results responsive to the search query, the quality scoring engine 230 may determine quality scores that reflect a higher degree of confidence for queries that have more search results that meet a minimum quality score and determine quality scores that reflect a lower degree of confidence for queries that have fewer search results that meet the minimum quality scores. For example, the quality scoring engine 230 may determine a quality score reflecting a high degree of confidence for a query "Plexus 6X preorder" that results in many search results with relative high quality scores and a quality score reflecting a low degree of confidence for a query "compact 6X blazing offers" that results in fewer search results that meet the minimum quality score. The quality scoring engine 230 may provide the search query to a search engine to determine that number of search results for the search query. For example, the quality scoring engine 230 may provide the query "Plexus 6X preorder" to a search engine and receive a response indicating that there are a high number of higher quality search results responsive the query, and in response, determine a quality score reflecting a high degree of confidence for the query.

For determining the quality score based on a popularity of the search query, the quality scoring engine 230 may determine quality scores that reflect a higher degree of confidence for queries that are currently more popular than queries that are currently less popular. For example, the quality scoring engine 230 may determine a quality score reflecting a higher degree of confidence for a query "Plexus 6X preorder" that many people have submitted as a search query in the past week and a quality score reflecting a lower degree of confidence for a query "performance" that few people have submitted as a search query in the past week. The quality scoring engine 230 may determine popularity of queries based on information from a query log database 232 that stores queries made by various users. For example, the query log database 232 may provide the quality scoring engine 230 information describing each time particular search queries were used.

For determining the quality score based on user behavior regarding search results of the search query, the quality scoring engine 230 may determine quality scores that reflect a higher degree of confidence for queries where users did not provide refined search queries and may determine quality scores that reflect a lower degree of confidence for queries where users provided refined search queries. The quality scoring engine 230 may determine whether users provided refined search results based on query search history stored in the query log database 232.

For determining the quality score based on an appearance of content in the displayed resource from which the search query is generated, the quality scoring engine 230 may determine quality scores that reflect a higher degree of confidence for queries generated from terms that appear to be from a title in a displayed resource. For example, the quality scoring engine 230 may determine that particular displayed text appears to be underlined and centered, and in response, determine that the particular displayed text is part of a title and determine a higher degree of confidence for queries that include terms from the particular displayed text.

In some implementations, the quality scoring engine 230 may determine that particular displayed text appears different than the majority of other displayed text and, in response, determine quality scores that reflect higher degrees of confidence for queries that include terms from the particular displayed text. For example, the quality scoring engine 230 may determine that particular displayed text is bolded and the majority of displayed text is not bolded and, in response, determine quality scores that reflect higher degrees of confidence for queries that include terms from the particular displayed text.

In some implementations, the quality scoring engine 230 may determine quality scores that reflect a greater degree of confidence for queries generated from terms that appear more frequently in the displayed resource. For example, the quality scoring engine 230 may determine that "Plexus 6X" is displayed twice and that "compact" is displayed once, and in response, determine a quality score for "Plexus 6X" that reflects a greater degree of confidence than a quality score for "compact."

The query selection engine 240 may obtain the quality scores from the quality scoring engine 230 and select one or more queries to recommend to the user. For example, the query selection engine 240 may receive an identification of "Plexus 6X" with the quality score 50%, "Plexus 6X Preorder" with the quality score 90%, and "performance" with the quality score 30% and, in response, select "Plexus 6X Preorder" to recommend to the user.

The query selection engine 240 may select the queries based on determining whether the queries have respective quality scores that satisfy a quality threshold. For example, the query selection engine 240 may select "Plexus 6X Preorder" as the quality score of 90% is greater than a quality threshold of 60%, 70%, 80%, or some other percentage less than 90%. In another example, the query selection engine 240 may not select "performance" as the quality score of 30% is lower than a quality threshold of 35%, 40%, 55%, or some other percentage above 30%.

In some implementations, the query selection engine 240 may additionally or alternatively select the queries based on a maximum number and provide a corresponding card for each selected query. For example, the query selection engine 240 may select a maximum of one, two, four, or some other number of queries and select the maximum number of queries with quality scores that reflect the greatest degree of confidence. In some implementations, the query selection engine 240 may additionally or alternatively select the queries based on a minimum. For example, the query selection engine 240 may select a minimum of one, two, four, or some other number of queries with quality scores that reflect the greatest degree of confidence.

The contextual card provider 250 may obtain an indication of the one or more selected queries and, for each selected query, provide a contextual card to the client contextual module 210 where the card includes the selected query and contextual information that is a selectable link for requesting resources responsive to the selected query. For example, the contextual card provider 250 may obtain an indication that "Plexus 6X Preorder" is selected and, in response, generate a contextual card and provide the contextual card to the client contextual module 210, where the card includes the text "Recommended Query" and "Plexus 6X Preorder," and includes a link that upon selection requests resources responsive to the query "Plexus 6X Preorder."

Figure 3:
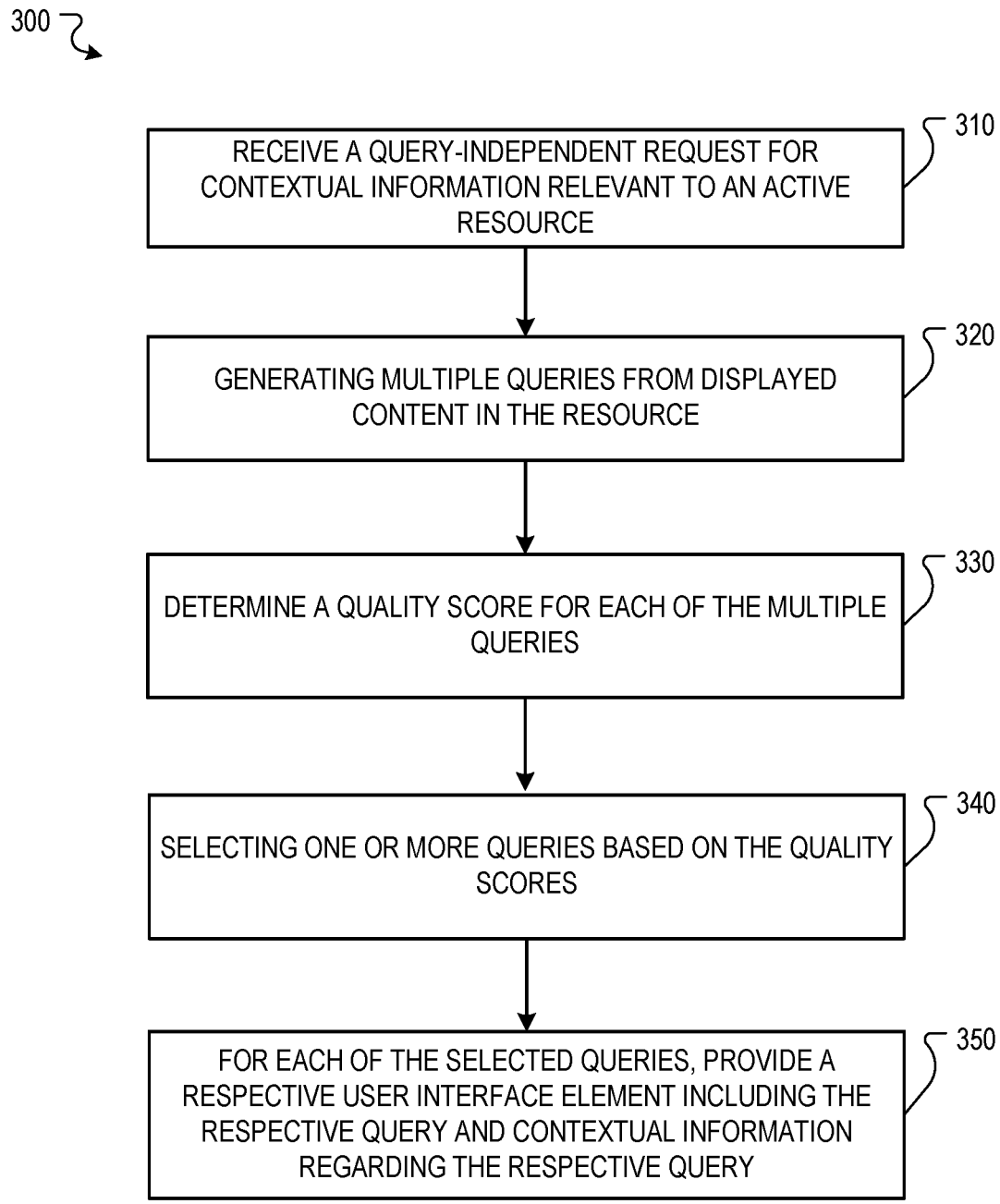
FIG. 3 is a flow diagram of an example process for providing contextual information for a displayed resource.

FIG. 3 is a flow diagram of a process 300 for providing contextual information for a displayed resource. For example, the process 300 can be used by the contextual information server 150 from the environment 100.

The process 300 includes receiving a query-independent request for contextual information relevant to an active resource (310). For example, the query generator 220 may receive a request that includes a document object model that defines (i) text of "Plexus 6X is now available for preorder. The Plexus 6X offers blazing performance in a compact size" and (ii) how the text is currently being displayed on a user device. In another example, the query generator 220 may receive a request that includes a screenshot of the text being displayed on a user device.

The process 300 includes generating multiple queries from displayed content in the resource (320). For example, the query generator 220 may extract the text "Plexus 6X is now available for preorder. The Plexus 6X offers blazing performance in a compact size" from a screenshot in the request or extract text "Plexus 6X is now available for preorder. The Plexus 6X offers blazing performance in a compact size" from a document object model that represents at least a portion of a resource displayed, and then generate queries that represent different words from the text in various orders.

The process 300 includes determining a quality score for each of the multiple queries (330). For example, the quality scoring engine 230 may receive the queries "Plexus 6X," "Plexus 6X Preorder," and "Performance" and, in response, determine a quality score of 50% for "Plexus 6X" as the query includes terms that appear in a title of the displayed resource, includes terms that appear multiple times in the displayed resource, and is moderately popular, determine a quality score of 90% for "Plexus 6X Preorder" as the query includes terms that appear in a title of the displayed resource, includes terms that appear multiple times in the displayed resource, and is very popular, and determine a quality score of 30% for "performance" as the query includes a term that only appears once in the displayed resource and is unpopular.

The process 300 includes selecting one or more queries based on the quality scores (340). For example, the query selection engine 240 may receive the query "Plexus 6X" labeled with a quality score of 50%, the query "Plexus 6X Preorder" labeled with the quality score of 90%, and the query "performance" labeled with the quality score of 30% and, in response, select the query "Plexus 6X Preorder" as the quality score of 90% is higher than a quality threshold of 70% and not select the queries "Plexus 6X" and "performance" as the respective quality scores of 50% and 30% are below the quality threshold of 70%.

The process 300 includes, for each of the selected resources, providing a respective user interface element including the respective query and contextual information regarding the respective query (350). For example, the contextual card provider 250 may generate a contextual card that includes the text "Recommended Query" and "Plexus 6X Preorder," and includes a selectable link for requesting a general search using the query "Plexus 6X Preorder" and a selectable link for requesting a news search using the query "Plexus 6X Preorder."

In some implementations, the process 300 can include additional steps, fewer steps, or some of the steps can be divided into multiple steps. For example, the contextual information server 150 may determine sub-quality scores based on respective factors that can be used for determining the quality scores, and then determine the quality scores by aggregating sub-quality scores.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

An example of one such type of computer is shown in FIG. 4, which shows a schematic diagram of a generic computer system 400. The system 400 can be used for the operations described in association with any of the computer-implement methods described previously, according to one implementation. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

While this specification contains many specific implementation details, these should not be construed as limitations on the scope of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
    displaying, on a user device, a resource in an application environment;
    receiving, by the user device, an input from user that indicates that the user desires contextual information relevant to the resource displayed in the application environment on the user device;
    providing, by the user device and to a server, a query-independent request for the contextual information relevant to the resource displayed in the application environment on the user device, wherein the server is configured to:
        generate multiple queries from displayed content from the resource, and
        select one or more of the multiple queries based on quality scores of the multiple queries; and
    receiving, by the user device and from the server for each of the selected one or more queries, a respective user interface element for display with the resource, wherein each user interface element includes contextual information regarding the respective query and includes the respective query.

2. The method of claim 1, wherein providing the query-independent request for the contextual information relevant to the resource displayed in the application environment on the user device comprises:
    providing, in the query independent request, a screenshot of a currently displayed portion of the resource to the server.

3. The method of claim 2, wherein providing, in the query independent request, the screenshot of the currently displayed portion of the resource to the server comprises:
    generating, by the user device, the screenshot from what is currently displayed on the user device.

4. The method of claim 1, wherein providing the query-independent request for the contextual information relevant to the resource displayed in the application environment on the user device comprises:
    providing the query-independent request that does not include one or more query terms entered by a user.

5. The method of claim 1, wherein receiving the input from user that indicates that the user desires contextual information relevant to the resource displayed in the application environment on the user device comprises:
receiving the input from the user that does not include one or more query terms entered by the user.

6. The method of claim 1, wherein the server is further configured to:
determine a quality of search results responsive to each query; and
determine the quality score for each of the multiple queries based at least on the quality of search results responsive to the respective query.

7. The method of claim 1, wherein the resource comprises one or more of a web page, an application page, or a textual conversation.

8. A system comprising:
one or more computers and one or more storage devices storing instructions that are operable, when executed by the one or more computers, to cause the one or more computers to perform operations comprising:
displaying, on a user device, a resource in an application environment;
receiving, by the user device, an input from user that indicates that the user desires contextual information relevant to the resource displayed in the application environment on the user device;
providing, by the user device and to a server, a query-independent request for the contextual information relevant to the resource displayed in the application environment on the user device, wherein the server is configured to:
generate multiple queries from displayed content from the resource, and
select one or more of the multiple queries based on quality scores of the multiple queries; and
receiving, by the user device and from the server for each of the selected one or more queries, a respective user interface element for display with the resource, wherein each user interface element includes contextual information regarding the respective query and includes the respective query.

9. The system of claim 8, wherein providing the query-independent request for the contextual information relevant to the resource displayed in the application environment on the user device comprises:
providing, in the query independent request, a screenshot of a currently displayed portion of the resource to the server.

10. The system of claim 9, wherein providing, in the query independent request, the screenshot of the currently displayed portion of the resource to the server comprises:
generating, by the user device, the screenshot from what is currently displayed on the user device.

11. The system of claim 8, wherein providing the query-independent request for the contextual information relevant to the resource displayed in the application environment on the user device comprises:
providing the query-independent request that does not include one or more query terms entered by the user.

12. The system of claim 8, wherein receiving the input from user that indicates that the user desires contextual information relevant to the resource displayed in the application environment on the user device comprises:
receiving the input from the user that does not include one or more query terms entered by a user.

13. The system of claim 8, wherein the server is further configured to:
determine a quality of search results responsive to each query; and
determine the quality score for each of the multiple queries based at least on the quality of search results responsive to the respective query.

14. The system of claim 8, wherein the resource comprises one or more of a web page, an application page, or a textual conversation.

15. A non-transitory computer-readable medium storing software comprising instructions executable by one or more computers which, upon such execution, cause the one or more computers to perform operations comprising:
displaying, on a user device, a resource in an application environment;
receiving, by the user device, an input from user that indicates that the user desires contextual information relevant to the resource displayed in the application environment on the user device;
providing, by the user device and to a server, a query-independent request for the contextual information relevant to the resource displayed in the application environment on the user device, wherein the server is configured to:
generate multiple queries from displayed content from the resource, and
select one or more of the multiple queries based on quality scores of the multiple queries; and
receiving, by the user device and from the server for each of the selected one or more queries, a respective user interface element for display with the resource, wherein each user interface element includes contextual information regarding the respective query and includes the respective query.

16. The medium of claim 15, wherein providing the query-independent request for the contextual information relevant to the resource displayed in the application environment on the user device comprises:
providing, in the query independent request, a screenshot of a currently displayed portion of the resource to the server.

17. The medium of claim 16, wherein providing, in the query independent request, the screenshot of the currently displayed portion of the resource to the server comprises:
generating, by the user device, the screenshot from what is currently displayed on the user device.

18. The medium of claim 15, wherein providing the query-independent request for the contextual information relevant to the resource displayed in the application environment on the user device comprises:
providing the query-independent request that does not include one or more query terms entered by the user.

19. The medium of claim 15, wherein receiving the input from user that indicates that the user desires contextual information relevant to the resource displayed in the application environment on the user device comprises:
receiving the input from the user that does not include one or more query terms entered by the user.

20. The medium of claim 15, wherein the server is further configured to:
determine a quality of search results responsive to each query; and
determine the quality score for each of the multiple queries based at least on the quality of search results responsive to the respective query.

* * * * *